July 10, 1934.　　　C. C. SCHILLER　　　1,965,910
FRUIT JUICE EXTRACTOR
Filed May 7, 1931
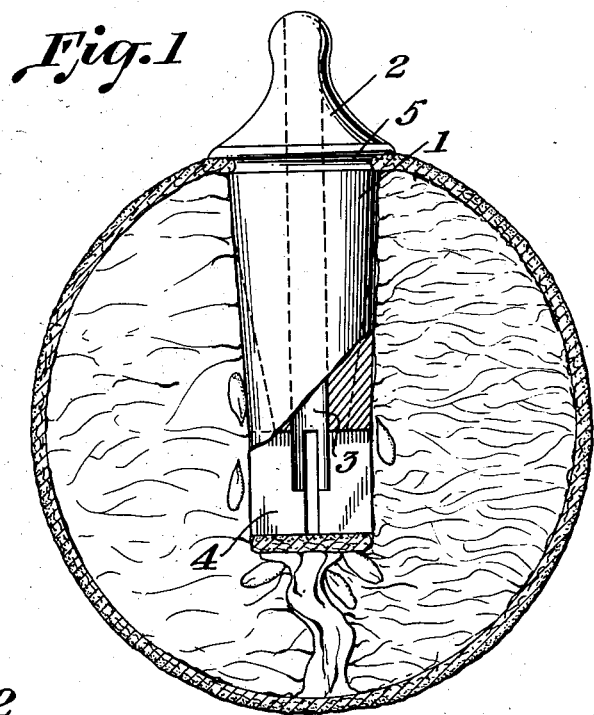
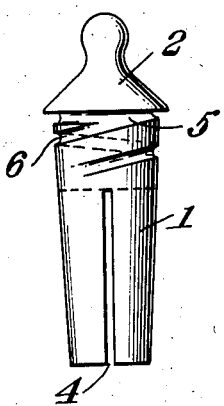
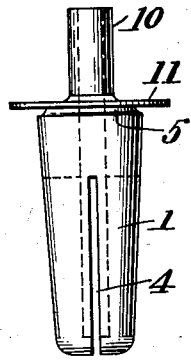
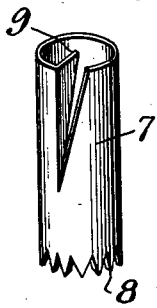
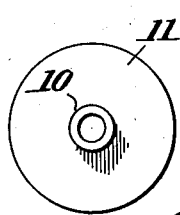
Inventor.
CHARLES C. SCHILLER
BY Mason Fenwick Lawrence
ATTORNEYS Patented July 10, 1934

1,965,910

UNITED STATES PATENT OFFICE 1,965,910

FRUIT JUICE EXTRACTOR

Charles Conrod Schiller, St. Petersburg, Fla.

Application May 7, 1931, Serial No. 535,711

4 Claims. (Cl. 146—3)

My invention has for its object the easy and quick removal of the eatable parts of citrus fruits encased within the rind by sucking, making unnecessary the removal of the rind or peel, or the exposure of the rag or seeds, eliminating the "messy" or disagreeable experience had when otherwise eaten. By making what is termed a "hand-fruit" of this kind of fruit I expect to increase the consumption of same, and render a service ultimately of great benefit to the industry of growing citrus fruits.

My invention can best be understood by reference to the accompanying drawing in which Figure 1 is a vertical section thru a citrus fruit showing my sucker in place, the sucker being shown in front elevation with a portion shown in section to better expose its construction; Figure 2 is a front elevation of a modification of same; Figure 3 shows a variation in design of mouthpiece; and, Figure 4 shows a perspective of a corer or cutter attachment that may be used in combination with the sucker.

Figure 5 shows a plane view of the mouth-piece shown in Figure 3.

The sucker is essentially a plug-like body 1 which may be made of any suitable material such as wood, metal, or porcelain. It is provided with a sucker or nipple-like mouth-piece of suitable design, the central opening of which constitutes a tubular well 3 extending in the direction of its length but terminating within a short distance of end of sucker.

The general shape of the body of sucker is slightly conical but may terminate towards the end in a cylindrical shape as shown, to permit the use of attachment later to be described. The lower end is crossed by one or more vertical slots 4, two of which are shown, extending radially thru the tubular well 3. Leads or grooves, indicated by dotted lines, may be used as shown in Fig. 1, or the slots may be made much longer as shown in Fig. 2. Beneath and parallelling the shoulder formed by the sucker mouth-piece is a shallow periferical groove 5. There may be a second groove 6, spiral in form, which constitutes the modification shown in Fig. 2, entering and forming a screw-like connection with the first groove.

In general, it may be stated, there are two kinds of citrus fruits when compared as to structure. One in which the sucker plug can be entered without first displacing or removing any of the eatable part of the fruit because of the spongey or porous pithy structure of the center of the fruit; and a second kind in which this can not be done. A grapefruit is typical of the first kind. The method in which the sucker is used in the first kind is as follows: Using the slotted end of sucker as a punch, either the blossom end or stem end is scored or indented by twisting or turning sucker while pressing same against the fruit. This done, the sucker is punched or pushed down into the fruit until the shoulder of mouth-piece abuts or rests on the outer surface of fruit. The conical shape of the body of the sucker slightly expands the circular opening made in punching with the result that when sucker plug has been completely entered, the contracting peel at opening made will enter and engage and fill the shallow groove 5 under mouth-piece. This tends to lock or hold sucker in fruit and practically seal jointure against escape of juice from fruit at this point. This feature may be more effectively accomplished by the type described and shown in modification, Fig. 2, the screw-like groove 6 leading or guiding the peel at opening into groove 5 with less stretching of the peel or rind of fruit.

During the operation of placing sucker in fruit, the disc of peel that had been punched, together with the attached pithy core has been forced down, the core being crumpled beneath, as shown in Fig. 1. At the same time, the segments or sections of fruit have been telescoped or ruptured at their apex, permitting the free escape of contents. With the sucker in position as described, all that is required to make available the eatable portion of the fruit thru the mouth-piece is for the user to pinch or massage the fruit, thus breaking down the cell structure and creating a fluid condition within the fruit. By continuing this process while sucking and squeezing the fruit, care being exercised not to crack or rupture the rind by too hasty handling, all the eatable part of fruit, including the pulp, may be enjoyed.

In the second kind of fruit, typified by the juicy Florida field orange, it is desirable to first punch or core the fruit providing an opening in which the sucker may be entered. To facilitate this I use an attachment shown in Fig. 3. This attachment, which in effect is a cutter or corer, is a cylindrical (though it may be conical) punch made of thin metal 7, preferably provided with cutting teeth 8. A portion of the upper wall of cylinder is cut at an angle to permit of same being turned in towards center to form a radial projection and which in use acts as a stop 8. To core fruit, the attachment is slipped over slotted end of sucker, the projecting stop being made to enter any one of the slots. With the sucker plug thus equipped, the second kind of fruit can be satisfactorily cored by first punching the fruit to the depth of the attachment. In doing this the disc of peel cut is pushed into fruit, the center pith being crumped within the metal corer, and, as the angular stop projection is longer than the slot of sucker, this impinges upon disc of peel engaging same. By twisting the sucker plug, winding same clock-wise, the disc of peel is rotated and attached pithy core broken or separated from opposite end of fruit. Now, upon removal of sucker and attachment, both the disc and attached pithy core will be found held within the attachment and may easily be dislodged and attachment removed. It is obvious, that the attachment could be fitted with a suitable handle, perhaps an ejector, and used as a corer independent of sucker plug.

What I call a "waster" type is shown in Fig. 3. To further the sale of oranges, dealers can be provided with suitable punches, as indicated, with which to make the required opening in fruit, and a sucker plug of shorter length, made of wood, paraffine, even candy, inserted in fruit and thus vended, making a package orange when suitably wrapped comparable to ice cream on a stick as a saleable article. In this type of sucker, it might prove desirable to make a spindle or straw-like mouth-piece 10, Fig. 3, over which a close fitting perforated disc of metal or paper, carrying a trade-mark or other advertising. This kind of sucker would not be intended for use a second time, but to be consumed or discarded with the sucked out rind of fruit.

Another variation would be to so construct sucker as to permit candy to be embodied in same with the object of having same dissolve as juices are drawn, sweetening same. The use of flavors would add to the novelty and permit variety in selection to the buyer.

It is admitted that there is no novelty in the mere introduction of a sucker into a citrus fruit, it being an old custom to insert a stick of candy and draw the juice up and thru grain of same.

What I claim as my invention is as follows:

1. A device for insertion into an orange, comprising a substantially cylindrical body slightly tapering toward one end thereof, said body having intersecting slots in the small end thereof, the other end of the body being provided with a circumferential groove and tapering mouth piece, a tubular well extending through the body and mouth-piece and communicating with said slots, said well having a diameter greater than the width of a slot, and a detachable cutter secured to said first mentioned end and having a portion extending into one of the slots.

2. A juice discharge device for insertion into an orange through an opening in the skin thereof, comprising a substantially cylindrical body slightly tapering toward one end thereof, said body having intersecting slots in the small end thereof, the other end of the body being provided with a circumferential groove, overhanging flange and tapering nipple-like mouth piece, a tubular well extending axially through the body and mouth-piece and communicating with said slots, and said well having a diameter greater than the width of a slot.

3. A juice discharge device for oranges comprising a substantially cylindrical body slightly tapered toward one end thereof having a mouth-piece at its large end, the smaller end being adapted to make a hole in the orange the size of said smaller end, and enter the same, and the degree of taper being such as to stretch the skin surrounding said hole without tearing it, said body being formed with an annular groove below said mouthpiece depressed below the tapered surface, but in diameter larger than said small end, into which the stretched skin expands when the discharge device is fully inserted in the orange, making a fluid tight joint.

4. A juice discharge device for insertion into an orange comprising a substantially cylindrical body slightly tapered toward one end thereof having a mouthpiece at its larger end including a circumferential flange extending beyond said body, the smaller end being adapted to make a hole in the orange the size of said smaller end and enter the same, and the degree of taper being such as to stretch the skin surrounding said hole without tearing it, said body being formed with an annular groove below said mouthpiece, of which said flange forms one side, depressed below said tapered surface, but in diameter larger than said small end, into which groove the stretched skin expands when the discharge device is fully inserted in the orange, making fluid tight joint.

CHARLES CONROD SCHILLER.